(12) United States Patent
Clubley et al.

(10) Patent No.: US 7,692,854 B2
(45) Date of Patent: Apr. 6, 2010

(54) REPETITIVELY PULSED LASER AND AMPLIFIER WITH DUAL RESONATOR FOR PULSE-ENERGY MANAGEMENT

(75) Inventors: David Clubley, Glasgow (GB); Angus Sutherland Bell, Glasgow (GB)

(73) Assignee: Coherent, Inc., Santa Clara, CA (US)

( * ) Notice: Subject to any disclaimer, the term of this patent is extended or adjusted under 35 U.S.C. 154(b) by 49 days.

(21) Appl. No.: 11/975,871

(22) Filed: Oct. 22, 2007

(65) Prior Publication Data
US 2009/0103172 A1 Apr. 23, 2009

(51) Int. Cl.
*H01S 3/00* (2006.01)
*H01S 3/106* (2006.01)
*H01S 3/17* (2006.01)

(52) U.S. Cl. .................................. 359/348; 372/25
(58) Field of Classification Search ................. 359/348; 372/25
See application file for complete search history.

(56) References Cited

U.S. PATENT DOCUMENTS

| | | | |
|---|---|---|---|
| 4,660,205 A * | 4/1987 | Harter et al. | 372/18 |
| 4,896,119 A * | 1/1990 | Williamson et al. | 359/348 |
| 5,075,893 A | 12/1991 | Epstein et al. | |
| 5,121,402 A | 6/1992 | Scheps | |
| 5,285,310 A * | 2/1994 | Miller et al. | 359/338 |
| 5,963,363 A | 10/1999 | Weston et al. | |
| 6,038,241 A | 3/2000 | von Elm et al. | 372/30 |
| 6,078,606 A | 6/2000 | Naiman et al. | |
| 6,414,980 B1 | 7/2002 | Wang et al. | 372/92 |
| 6,418,154 B1 | 7/2002 | Kneip et al. | 372/25 |
| 6,683,893 B2 | 1/2004 | Wang | 372/10 |
| 6,807,198 B1 * | 10/2004 | Furbach et al. | 372/18 |
| 6,931,035 B2 | 8/2005 | Wang | 372/10 |
| 2004/0228376 A1 | 11/2004 | Dane et al. | |
| 2008/0112041 A1 * | 5/2008 | Clubley et al. | 359/305 |

FOREIGN PATENT DOCUMENTS

| | | |
|---|---|---|
| EP | 0609978 A1 | 8/1994 |
| JP | 10-190117 A | 7/1998 |
| WO | WO-00/55947 A1 | 9/2000 |

OTHER PUBLICATIONS

U.S. Appl. No. 11/599,832, filed Nov. 15, 2006, by David Clubley et al, 17 pages in length.
Boczar, B. P. et al. (Jun. 1, 1983). "New Scheme for Ultrashort-Pulsed Nd3+:YAG Laser Operation: A Branched Cavity, Internally Seeded Regenerative Amplifier," *Applied Optics* 22(11):1611-1613.

* cited by examiner

*Primary Examiner*—Eric Bolda
(74) *Attorney, Agent, or Firm*—Morrison & Foerster LLP

(57) ABSTRACT

A regenerative amplifier includes a gain-medium that is optically pumped by CW radiation. The amplifier has primary resonator for amplifying pulses. The primary resonator has an optical switch for opening and closing the primary resonator. The amplifier has a secondary resonator that includes the gain-medium and a selectively variable attenuator, but not the optical switch. The optical switch and the variable attenuator are cooperatively controlled in response to repeated trigger-signals such that the amplifier delivers corresponding amplified pulses each having about the same energy independent of repetition frequency of the signals below some predetermined value.

17 Claims, 5 Drawing Sheets

US 7,692,854 B2

REPETITIVELY PULSED LASER AND AMPLIFIER WITH DUAL RESONATOR FOR PULSE-ENERGY MANAGEMENT

TECHNICAL FIELD OF THE INVENTION

The present invention relates in general to repetitively pulsed lasers and pulsed optical amplifiers. The invention relates to such lasers and amplifiers in which there is a provision for maintaining a constant pulse power or pulse energy as the pulse repetition rate is changed.

DISCUSSION OF BACKGROUND ART

In laser machining or material processing operations in which pulses of laser radiation are repetitively delivered to a workpiece it is often necessary to change the repetition frequency (PRF) of the pulses while maintaining the peak power of the pulses, or the energy per pulse, constant. In a pulsed laser or a pulsed, master oscillator power amplifier (MOPA) laser-system including a continuously pumped gain-medium a change in repetition rate can result in a change in pulse energy. This is because the interval between the delivery of pulses in a train, among other factors, determines the gain available for each pulse. Further, in a pulsed-laser that is activated to provide a pulse train after a period of inactivity in which the gain medium continues to be pumped, the power of the first pulse in a train can be much higher than any subsequent pulses.

Several techniques for providing variation of the PRF of a pulsed laser, or a pulsed laser and amplifier system while maintaining constant energy per pulse have been described in the prior-art. These techniques include operating the laser or amplifier in a continuous (CW) mode while pulses are not being delivered, allowing the laser or amplifier to operate in a CW mode between pulses in a train, and operating the laser or amplifier at a PRF much greater than the nominal PRF before a pulse train is delivered or between pulses in a train. Examples of such techniques are described in one or more of U.S. Pat. Nos. 6,038,241; 6,414,980; 6,418,154; 6,683,893; and 6,931,035, all of which are assigned to the assignee of the present invention.

The method of carrying of the techniques primarily involve certain sequences of operation of a Q-switch which is normally provided in the laser for causing the laser to operate in a pulsed mode and controlling the PRF of the laser, whether or not any measures were taken for controlling pulse energy or first pulse suppression. Such additional operations include steps in which the Q-switch must be selectively partially opened (or closed). An acousto-optic Q-switch is preferred for the operation of the lasers described. This type of Q-switch is operable in a partially open or closed mode.

Adding such Q-switch operations for pulse-energy control adds to the complexity of circuitry required to control the Q-switch as careful synchronization of the additional operations with "normal" operations is required. Certain amplifier types such as regenerative amplifiers used in ultrafast laser-amplifier systems, require a Pockels-cell type Q-switch, which operates by switching electrically induced birefringence, and does not lend itself to operation in a partially open or partially closed mode. It would be advantageous to have a method for controlling pulse energy and providing first pulse suppression that did not require complex, synchronized Q-switch operations. Preferably such a method would be primarily passive and be effective independent of the type of Q-switch in the laser.

SUMMARY OF THE INVENTION

In one aspect apparatus in accordance with the present invention for amplifying a seed pulse in response to an external trigger-signal, comprises a source of seed pulses and a primary resonator terminated by first and second mirrors and arranged to receive the seed pulses. The primary resonator includes a gain-medium and an optical switch. A pump radiation source is arranged to optically pump the gain-medium in a continuous-pumping mode, thereby providing available gain in the gain-medium. The apparatus also includes a secondary resonator including the gain-medium. The secondary resonator does not include the optical switch, but includes a selectively-variable attenuator for selectively varying losses in the secondary resonator. The optical switch and the selectively-variable attenuator are controllable such that when the gain-medium is being pumped and the seed pulse is not being amplified, the selectively-variable attenuator allows lasing to occur in the secondary resonator at a level selected to limit gain in the gain-medium to a predetermined level. The optical switch and the selectively variable attenuator are also controllable such that on receipt of the trigger signal, the selectively-variable attenuator causes lasing to cease in the secondary resonator for a predetermined time period during which gain in the gain medium is allowed to rise above the predetermined level, the optical switching causes the seed pulse to be trapped in the primary resonator and the trapped seed pulse is amplified in the primary resonator, and such that after the predetermined time period the optical switch causes the amplified seed pulse to be delivered from the primary resonator, and the selectively-variable attenuator causes lasing to occur in the secondary resonator at the level selected to limit gain in the gain-medium to the predetermined level.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
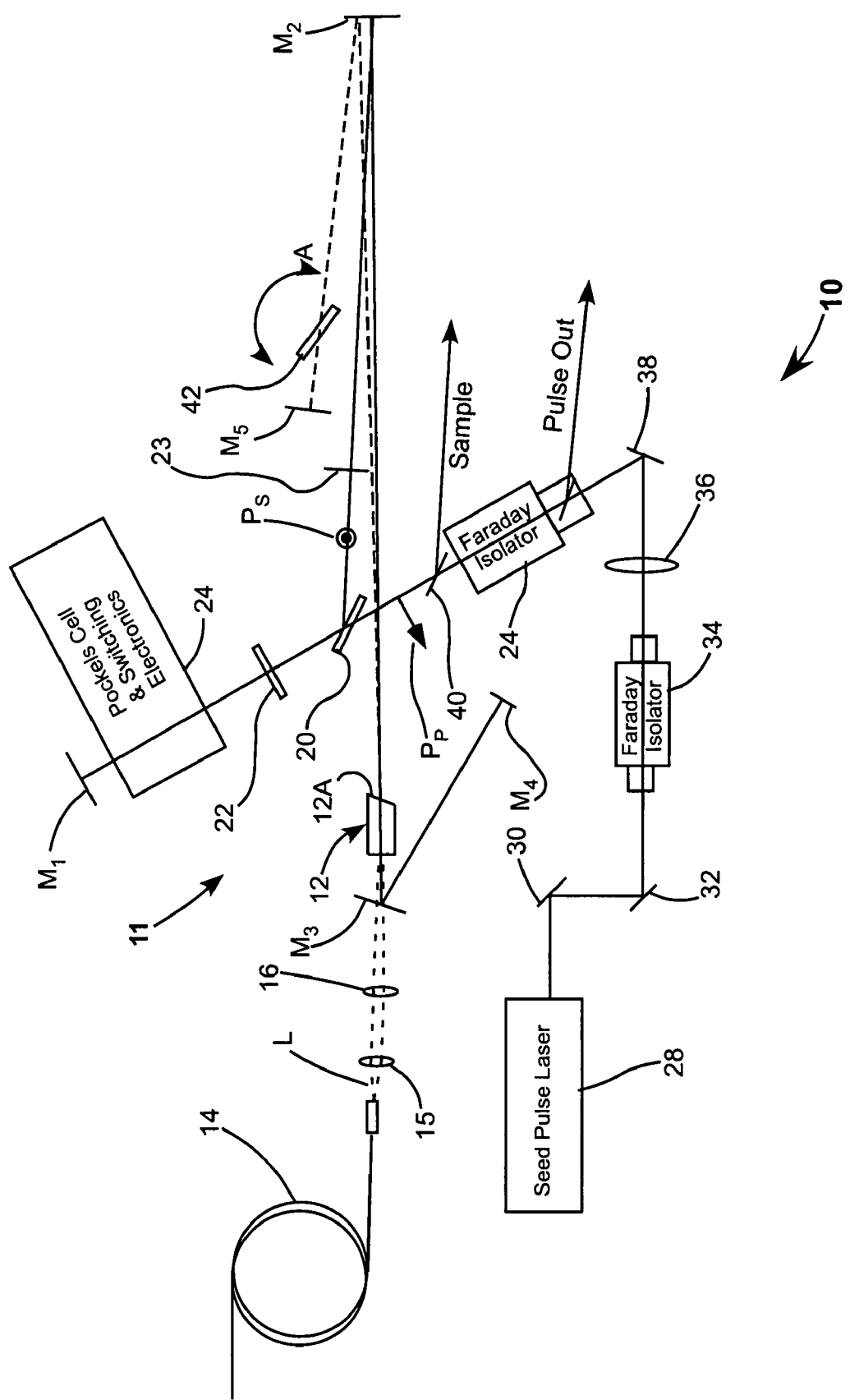
FIG. 1 schematically illustrates one preferred embodiment of laser apparatus in accordance with the present invention including a seed pulse laser delivering seed-pulses to a regenerative amplifier, the regenerative amplifier including a folded primary resonator formed between first and second mirrors and a folded secondary resonator formed between the first mirror and a third mirror for providing gain-clamping when the regenerative amplifier is not amplifying pulses.

Referring now to the drawings, wherein like components are designated by like reference numerals, FIG. 1 schematically illustrates a preferred embodiment 10 of laser apparatus in accordance with the present invention. Apparatus 10 includes a regenerative amplifier 11 having a primary resonator terminated by mirrors $M_1$ and $M_4$, and "folded" by mirrors $M_2$ and $M_3$ and a polarizing beamsplitter 20. Because the resonator is folded by the polarizing beamsplitter it is only a resonator for radiation incident on the beamsplitter polarized perpendicular to the plane of incidence of the beamsplitter as indicated by arrowhead $P_S$.

The primary resonator includes a birefringent gain-medium 12 that has different gain for two polarization-planes perpendicular to each other. One such gain-medium is neodymium-doped gadolinium orthovanadate Nd:GdVO$_4$. This is a tetragonal crystal material usually arranged with an a-axis aligned with the resonator axis, with the highest gain being for light plane-polarized parallel to the c-axis. In the continuing description it is assumed that gain-medium 12 is Nd:GdVO$_4$, but this should not be construed as limiting the present invention. In this arrangement, the axis of the primary resonator terminated by mirrors $M_1$ and $M_4$ is aligned with the path of the o-ray through the birefringent gain-medium, i.e., along the a-axis of the crystal Gain-medium 12, during an operational period of apparatus 10 is continually optically pumped by radiation (pump-light) L from a diode-laser array (not shown) and delivered from the diode-laser array by an optical fiber 14. The gain-medium provides peak gain at about 1064 nm. The pump-light is focused into the gain-medium by lenses 15 and 16 through mirror $M_3$ which has high reflection at the peak gain wavelength and high transmission at the wavelength of the pump-light. When regenerative amplifier 14 is not amplifying a pulse, a quarter-wave plate 22 cooperative with a Pockels cell 24 and polarizing beamsplitter 20 prevents radiation from being generated in the primary resonator terminated by mirrors $M_1$ and $M_4$.

This is achieved by setting the Pockels cell to provide net zero polarization rotation such that plane-polarized radiation that has been reflected from polarizing beamsplitter 20 and made a double pass through the quarter-wave plate 22 and the Pockels cell is polarization-rotated 90° and is now polarized in a plane indicated by arrow Pp that is transmitted by the polarizing beamsplitter of the primary resonator. Accordingly radiation can not circulate in the primary resonator and any seed pulses are not trapped. This can be described, for purposes of this description and the appended claims, as the primary resonator being in an "open" mode. In the open mode, the gain n the gain-medium would be at an indeterminate level absent any preventive measure.

This is prevented in this embodiment of the inventive apparatus by providing a secondary resonator terminated by mirror $M_4$ and another mirror $M_5$ and folded by mirror $M_2$. This resonator does not include the switching arrangement provided by polarizing beamsplitter 20, quarter-wave plate 22 and the Pockels cell. The longitudinal axis of this secondary resonator is aligned with the path of the e-ray (extraordinary ray) through the birefringent gain-medium. The a-axis is the path of the ordinary ray (o-ray) through the gain medium. The longitudinal axis of the primary resonator is aligned with the path of the o-ray though the gain-medium. The axes of the primary and secondary resonators are collinear between the gain-medium and mirror $M_4$. In the gain-medium and between the gain-medium and fold-mirror $M_2$ the axes of the primary and secondary resonators (designated by solid and dashed lines respectively) diverge. Preferably, the face 12A of the gain-medium (the face furthest from mirror M3) is non-orthogonally aligned (wedged) with the a-axis to increase the angle between the resonator axes. A wedge angle of about 3° on face 12A of provides that there is an angle of about 0.7 degrees between the resonator axes.

CW radiation is generated in the secondary resonator for the "wrong" polarization-plane, i.e., the polarization-plane for which the gain of gain-medium 12 is least. The power of radiation generated can be controlled by selectively adjusting a tilt angle that a transparent plate 42 such as a glass or fused silica plate makes with the secondary-resonator axis as indicted by arrows A. The gain is preferably held at a level slightly higher, for example about 10% higher than the peak gain reached during delivery of a pulse train. The primary resonator is a resonator only for plane-polarized radiation having the "right" polarization-orientation in gain-medium 12, i.e., the polarization-orientation for which the gain of gain-medium 12 is greatest. An acousto-optic modulator could be used instead of plate 42 to provide active control of losses.

When it is desired to deliver a train of pulses from the regenerative amplifier, a train of seed-pulses is delivered from a mode-locked seed-pulse laser 28. Mode-locked lasers typically provide pulses having a duration of a few picoseconds or less at pulse-repetition frequencies (PRFs) of a few megahertz (MHz). The regenerative amplifier is operated at pulse-repetition frequencies of tens to hundreds of kilohertz (KHz), accordingly, only selected ones of the pulses from the seed laser are amplified. The selection mechanism is well-known to those skilled in the art but is reviewed briefly below as it pertains to the present invention.

A pulse to be amplified is directed by mirrors 30 and 32 through a Faraday isolator 34, a lens 36 and another Faraday isolator 24 and delivered to polarizing beamsplitter 20 plane-polarized in a plane that is transmitted by the polarizing beamsplitter. The seed pulse enters the primary resonator while it is in the open state. The polarization-plane of the pulse is then rotated by 90 degrees following a double pass through the quarter-wave plate and the (inactive) Pockels cell as described above and therefore will be reflected by the polarizing beamsplitter 20 into the primary resonator and towards gain-medium 12. At about this point, the Pockels cell is switched to a state such to provide a 90 degree polarization rotation on the double pass, whereby a double pass through the quarter-wave plate and the Pockels cell provides no net polarization. Accordingly the pulse is trapped and circulates in the primary resonator, being amplified as energy is extracted by the pulse from gain-medium 12. This will be referred to as the "closed" state of the primary resonator. A half-wave plate 23 rotates the polarization of the pulse to that for which gain is strongest in gain medium 12 and re-rotates the polarization plane of the pulse returning from the gain-medium into the orientation that is reflected by polarizing beamsplitter 20. Essentially as soon as this circulation begins, gain in the gain-medium is reduced below the threshold required for CW lasing in the secondary resonator, and lasing in the secondary resonator ceases.

After a predetermined time, the Pockels cell is switched back to a state such that a double-pass through quarter-wave plate 22 and the Pockels cell produce a net 90 degree polarization rotation, and the amplified pulse is transmitted out of the primary resonator via beam splitter 20. Optionally, a sample of the pulse can be obtained from a beamsplitter 40. The main output pulse is directed out of apparatus 10 along the rejection channel of Faraday isolator 24 as depicted. This pulse trapping and transmitting is repeated until the train of amplified pulses is delivered. After the final pulse in a train is delivered the gain increases until CW lasing begins in the secondary resonator as described above, and clamps the gain in gain-medium 12 until it is desired to deliver another train of pulses.

Figure 2:
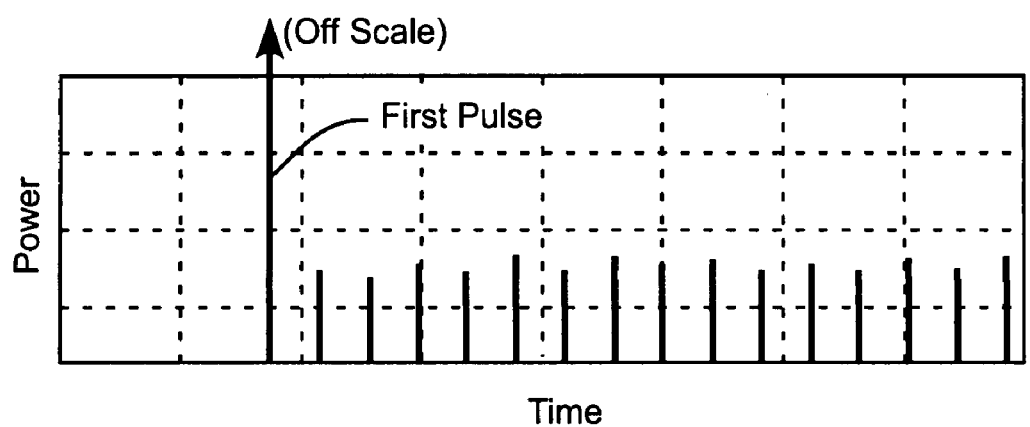
FIG. 2 schematically illustrates an oscilloscope trace of a 50 kilohertz pulse train generated by an example of prior-art regenerative amplifier apparatus similar to the apparatus of FIG. 1 but not having the secondary resonator for gain clamping.

FIG. 2 is a graph schematically illustrating an oscilloscope trace of a 50 KHz pulse-train generated by a prior-art regenerative amplifier apparatus being an example of the apparatus of FIG. 1 but not having a secondary resonator for providing gain clamping. In this example, the gain-medium was Nd:GdVO$_4$ pumped by 808 nm radiation from a diode-laser array. Seed-pulse laser 28 was a low-power mode-locked fiber laser delivering pulses having a duration of about 6 picoseconds at a PRF of about 40 MHz. The average peak power of the second and subsequent pulses in a pulse-train was ten percent of the peak power of the first pulse in the pulse-train.

Figure 3:
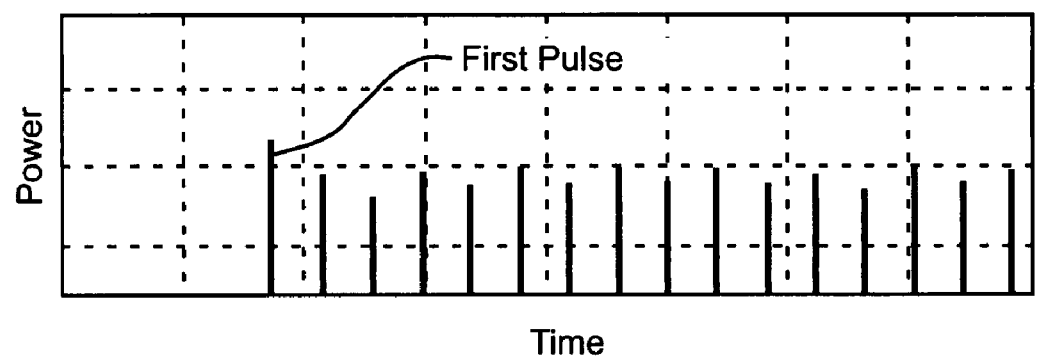
FIG. 3 schematically illustrates an oscilloscope trace of a 50 kilohertz pulse train generated by an example of the apparatus of FIG. 1.

FIG. 3 is a graph schematically illustrating an oscilloscope trace of a 50 KHz pulse-train generated by the example of the apparatus of FIG. 1 including the inventive secondary resonator formed between mirrors $M_4$ and $M_5$. It can be seen that, in this case, the first pulse in the pulse-train has only a slightly higher power than the average peak power of the second and subsequent pulses in the pulse-train.

It was found that when the regenerative amplifier was operated at higher PRF, the secondary resonator became increasingly less effective at first pulse suppression. This is believed to be because the peak gain between pulses was increasingly reduced. In a with-and-without-the-secondary resonator comparison made operating the above-discussed example of apparatus 10 at a PRF of 200 KHz, it was found that the first pulse in a pulse-train with the secondary-resonator gain-clamping operative had a peak power that was about five times the average peak power of the second and subsequent pulses in the pulse-train. Without the gain-clamping, however, the peak-power in the first pulse was about 20 times the average peak power of the second and subsequent pulses in the pulse-train. It is to be expected that this frequency of dependence of the effectiveness of the present invention may be different for different gain-media.

Those skilled in the art will recognize that while the present invention has been described in the context of a particular example of a regenerative amplifier, the invention is applicable to any regenerative amplifier including a gain-medium having a polarization dependent gain and being sufficiently birefringent to allow a secondary resonator to be added according to principles of the present invention. Examples of such gain media include but are not limited to (any) ion-doped yttrium orthovanadate (X:YVO$_4$), and ion-doped gadolinium orthovanadate (X:GdVO$_4$).

Figure 4:
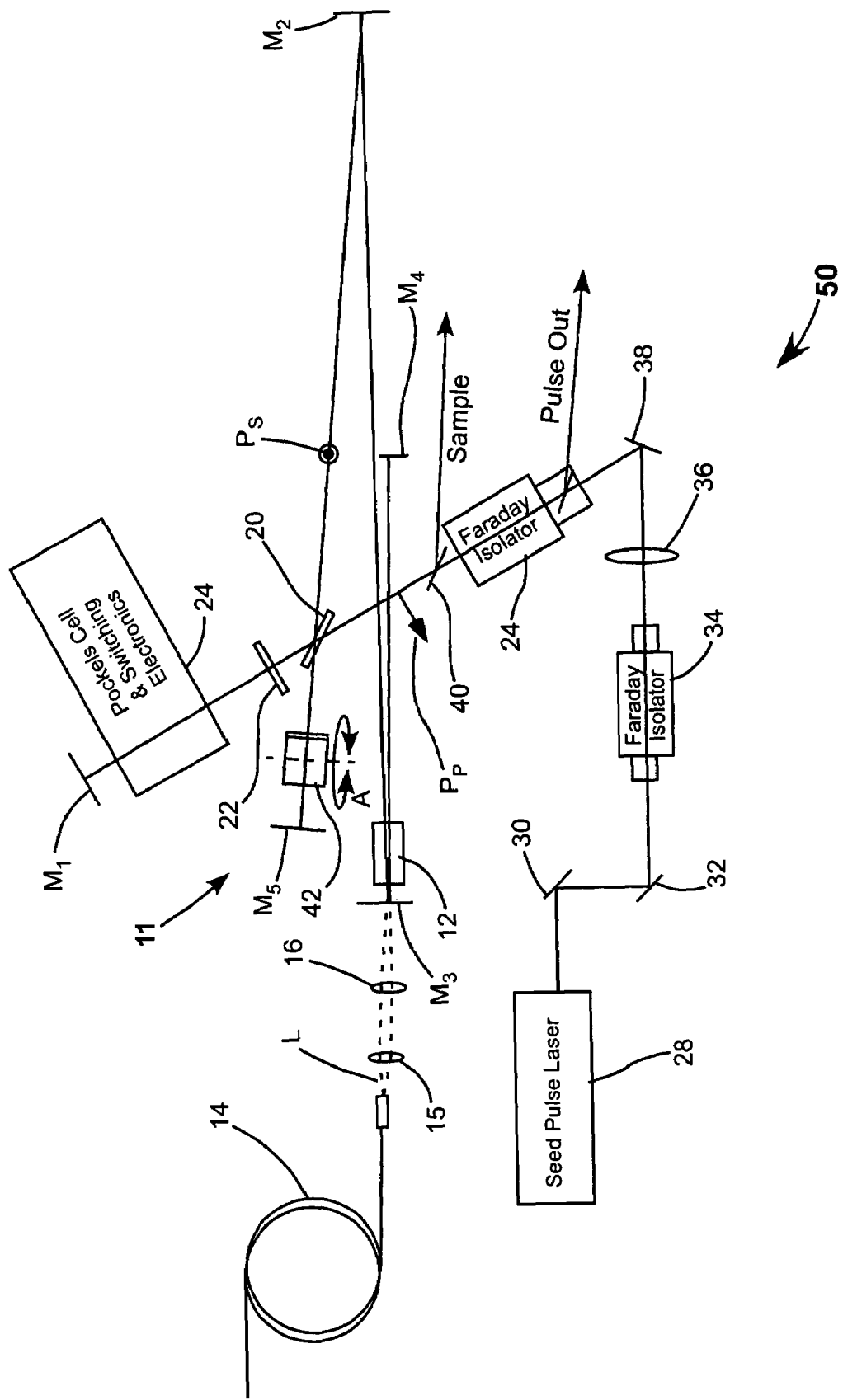
FIG. 4 schematically illustrates another embodiment of laser apparatus in accordance with the present invention, similar to the embodiment of FIG. 1 but wherein the secondary resonator is differently configured.

The invention is also applicable to gain-media that have minimal birefringence and minimal polarization dependence such Ti:sapphire and Nd:YAG. By way of example, FIG. 4 schematically illustrates an embodiment 50 of apparatus in accordance with the present invention that can be used with such a gain-medium. Apparatus 50 is similar to above apparatus 10 with an exception that the secondary resonator is differently configured. The secondary resonator is terminated by mirrors M4 and M5 as in apparatus 10. However in apparatus 50 the axes of the primary and secondary resonators are collinear between mirror M4 and a polarizing beamsplitter 20. Polarizing beamsplitter 20 transmits radiation having a polarization-orientation perpendicular to that for which the primary resonator is configured and accordingly the resonator axes are at an angle to each other and the secondary resonator does not include the optical switching arrangement of the primary resonator. A rotatable plate 42 is included in the secondary resonator to provide that the secondary resonator can be made sufficiently lossy that CW lasing will cease when the secondary resonator becomes operational as described above.

Those skilled in the art will also recognize without further detailed description or illustration that principles of the present invention are applicable not only in a primary resonator that is operated as a regenerative amplifier but also in a primary resonator that is operated as a Q-switched laser to generate pulses. In the case of the embodiments of FIGS. 1 and 4, wherein a Pockels-cell switching arrangement is deployed, the primary resonator could be operated as a Q-switched laser. The primary resonator could also be operated as a Q-switched laser by replacing the Pockels-cell 24 and quarter-wave plate 22 by an acousto-optic modulator, and making mirror $M_1$ partially transparent to couple output out of the primary resonator. In these and other such variations, the secondary resonator could be operated as described above to limit gain in the gain-medium when pulses were not being generated in the primary resonator.

Returning now to a discussion of regenerative amplifiers, apparatus 10 of FIG. 1 and apparatus 50 of FIG. 4 are described in a context of being operated at a fixed repetition rate. While means of varying losses in the secondary resonator are described, these means are not active and are simply calibrated to clamp gain at a level suitable for suppressing the first pulse to the power level of pulses consistent with the fixed repetition rate.

In certain applications it would be advantages to be able to change the pulse repetition rate while the amplifier is operating, and possibly even advantageous to be able to deliver pulses with arbitrary (irregular) intervals therebetween. One method for accomplishing this is described below with reference to FIG. 5. Here an apparatus 60 is described that is similar to apparatus 10 of FIG. 1 with an exception that a variable loss device 64 in the secondary resonator is made actively cooperative with Pockels-cell switching electronics 24, here via a controller 62. In this example, the variable loss device (variable attenuator) is an acousto-optic modulator (AOM), but this should not be considered as limiting the present invention. Pulses from the regenerative amplifier are delivered responsive to corresponding external trigger signals, here delivered to the controller.

In a preferred method of operating apparatus 60, it is necessary to determine the maximum PRF that will be required from the amplifier. The number of round trips for optimizing amplification of a seed pulse at that repetition rate is determined. By way of example, a PRF of 60 kHz may require five round trips, after trapping the seed pulse into the amplifier before delivery of the amplified pulse to optimize output pulse energy. This number of round trips becomes a constant for the scheme. It is assumed, as will be true in most instances, that the optimized number of round trips will be sufficiently low that the gain of the amplifier can be far from saturated. This means that CW lasing in the secondary resonator can reduce the gain to well below the steady-state gain for operation at the maximum PRF.

This preferred method of operation is described below with reference to the timing diagram of FIG. 6. AOM 64 is set to limit the amplifier (primary resonator) gain significantly below a level that would be reached with the amplifier free running at the predetermined maximum PRF. When pulses are not being amplified, power is coupled out of the apparatus via the CW lasing in the secondary resonator, limiting the gain in gain-medium 12 and maintaining a relatively constant thermal lensing in the gain-medium.

Figure 6:
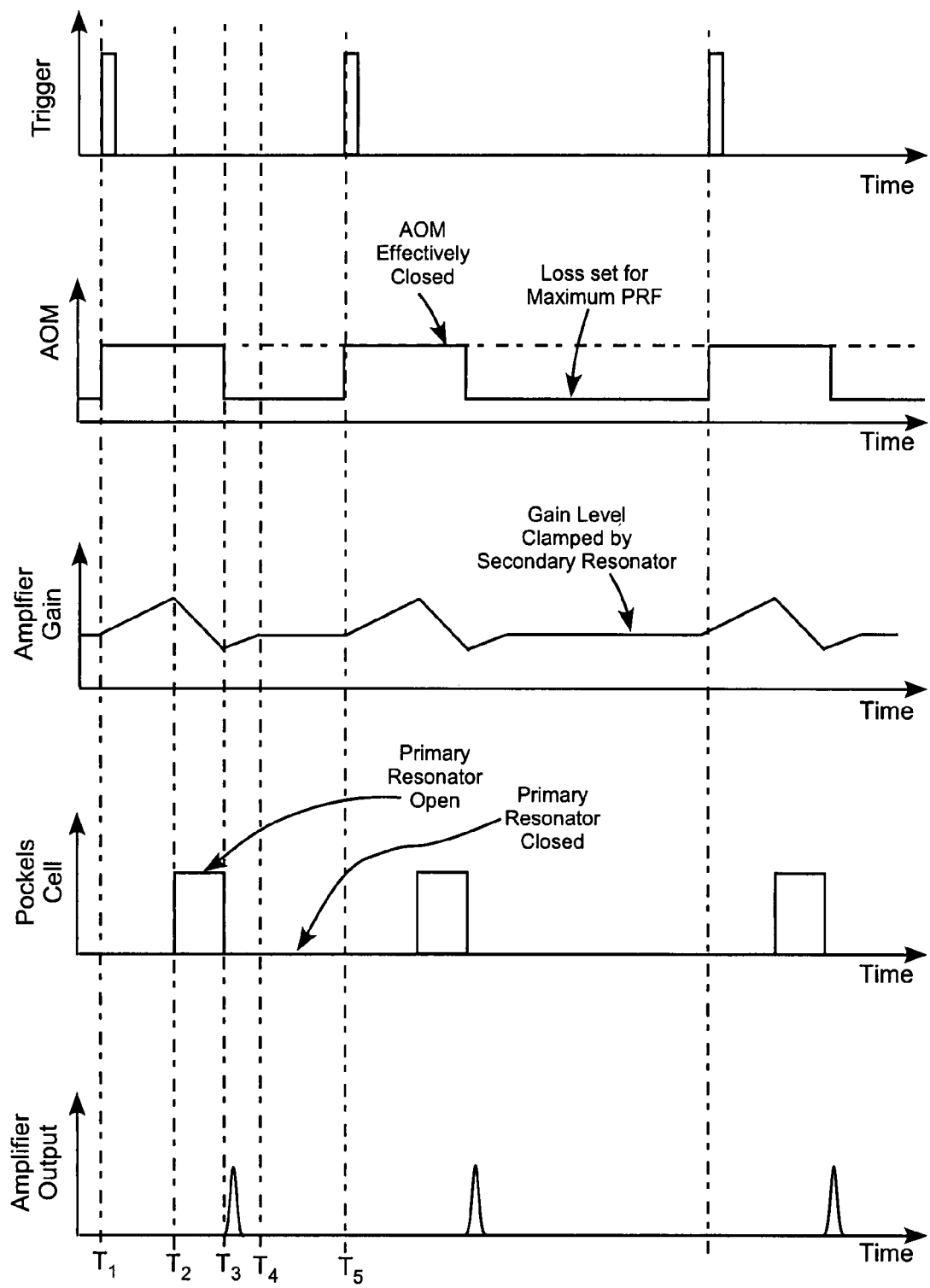
FIG. 6 is a timing diagram schematically illustrating a sequence of operations in the apparatus of FIG. 5 for providing the time-interval independent constant pulse energy in the apparatus.

At time $T_1$, an external trigger is supplied to controller 62 requesting a pulse from the amplifier (see top line of FIG. 6). On receipt of the external trigger, controller 62 switches the loss created by AOM 64 from the gain clamping level to a level too high to permit lasing in the secondary resonator (see line 2 of FIG. 6). Now gain in gain-medium 12 is free to rise. The gain is allowed to rise for a predetermined time, less than the time necessary to achieve gain-saturation (see line 3 of FIG. 6). The time interval over which the gain is allowed to rise is characteristic of the chosen maximum rep rate. At time $T_2$ controller 62 instructs the Pockels cell switch to "close" the resonator to trap a seed pulse in the amplifier (see line 4 of FIG. 6) as described above. The pulse circulates in the amplifier for the predetermined amount of round trips. As the power of the pulse builds, the gain (stored energy) in gain-medium 12 falls (see again line 3 of FIG. 6). At time $T_3$, the predetermined number of round trips has been made and the gain in the gain-medium is below the clamped level. Controller 62 then instructs the Pockels cell switch to "open" the resonator to dump (deliver) the amplified pulse from the amplifier, and also to reset the variable attenuator loss to the original value for gain-clamping. At some time $T_4$ the gain in gain-medium 12 reaches the level limited by the gain-clamping. The gain remains at that level until another external trigger is received by the controller, for example at time $T_5$.

The above described method provides about constant pulse energy independent of pulse repetition rate provided that the external trigger pulse is not applied faster than the maximum selected repetition rate. The amplifier is simply responding to an external trigger and the starting gain in the amplifier for each pulse is the same.

Figure 5:
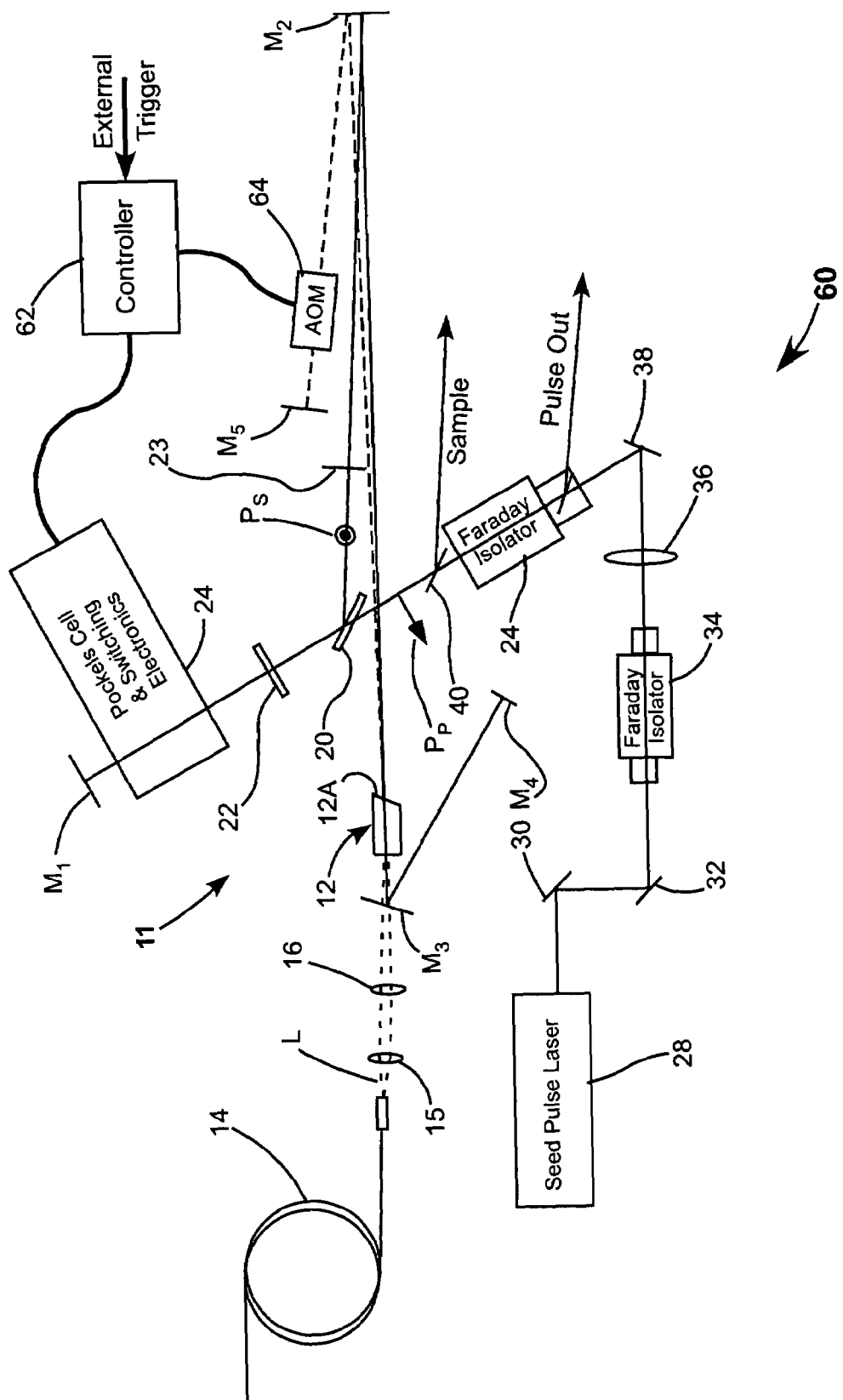
FIG. 5 schematically illustrates another preferred embodiment of laser apparatus in accordance with the present invention, similar to the apparatus of FIG. 1 but wherein gain clamping is arranged to be switched on and off cooperative with amplification of pulses such that all amplified pulses in a train thereof have about the same energy independent of time intervals between the pulses.

It should be noted here that controller 62 and Pockels cell and switching electronics 24 are indicated in FIG. 5 as separate entities merely for convenience of description. The control functions may be combined in a single entity without departing from the spirit and scope of the present invention. Further, while the inventive gain-limiting and switching method is described in the context of operating the apparatus of FIG. 5 which is a modification of the apparatus of FIG. 1, the apparatus of FIG. 4 may be similarly modified and operated. Those skilled in the art may devise other modifications of the inventive apparatus that may also be operated as described above without departing from the spirit and scope of the present invention.

In summary, while the present invention is described and depicted herein in terms preferred embodiments, the invention is not limited to the embodiments described and depicted. Rather, the invention is limited only by the claims appended hereto.

What is claimed is:

1. A regenerative amplifier for amplifying a seed pulse in response to an external trigger-signal, comprising:
   a source of seed pulses;
   a primary resonator terminated by first and second mirrors and arranged to receive the seed pulses, the primary resonator including a gain-medium and an optical switch, said optical switch operable to selectively close the primary resonator to trap a seed pulse from the source and to open the primary resonator to deliver the seed pulse therefrom after the seed pulse has been amplified in the primary resonator;
   a pump radiation source arranged to optically pump the gain-medium in a continuous-pumping mode thereby providing available gain in the gain-medium;
   a secondary resonator including the gain-medium, the secondary resonator not including the optical switch, but including a selectively-variable attenuator for selectively varying losses in the secondary resonator; and
   wherein in the optical switching arrangement and the selectively-variable attenuator are controllable such that when the gain-medium is being pumped and the seed pulse is not being amplified the selectively-variable attenuator allows lasing to occur in the secondary resonator at a level selected to limit gain in the gain-medium to a predetermined level, and wherein upon receipt of a trigger signal, the selectively-variable attenuator causes lasing to cease in the secondary resonator for a predetermined time period during which gain in the gain medium is allowed to rise above the predetermined level, the optical switching causes the seed pulse to be trapped in the primary resonator and the trapped seed pulse is amplified in the primary resonator, and such that after the predetermined time period the optical switch causes the amplified seed pulse to be delivered from the secondary resonator, and the selectively-variable attenuator again allows lasing to occur in the secondary resonator at the level selected to limit gain in the gain-medium to the predetermined level.

2. The apparatus of claim 1, wherein the optical switch includes a Pockels cell, and the selectively-variable attenuator is an acousto-optic modulator.

3. The apparatus of claim 1, wherein the gain-medium is a birefringent medium and wherein the primary resonator is terminated by first and second mirrors and the secondary resonator is terminated by the first mirror and a third mirror.

4. The apparatus of claim 3, wherein between the first mirror and the gain-medium the resonator-axes of the primary and secondary resonators are collinear, and in the gain-medium and between the gain-medium and the third mirror the resonator-axes of the primary and secondary resonators are at an angle to each other.

5. The apparatus of claim 4, wherein the gain-medium has a stronger gain for radiation plane-polarized in a first polarization-orientation than for radiation plane-polarized in a second-orientation perpendicular to the first orientation.

6. The apparatus of claim 5, wherein the primary resonator is configured for circulating through the gain-medium only radiation plane-polarized in the first polarization-orientation.

7. The apparatus of claim 6, wherein the primary resonator is configured for circulating through the gain-medium only radiation plane-polarized in the second polarization-orientation.

8. The apparatus of claim 7, wherein the optical switch includes a Pockels cell cooperative with a quarter-wave plate and a polarizing beamsplitter and wherein the primary resonator is folded by the polarizing beamsplitter.

9. The apparatus of claim 8, wherein the selectively variable attenuator in the secondary resonator is an acousto-optic modulator.

10. The apparatus of claim 1, wherein the second predetermined time period is sufficient to a predetermined number of round trips in the primary resonator for optimally amplifying the seed pulse trapped therein.

11. A regenerative amplifier for providing a train of amplified seed pulses in response to a corresponding train of trigger-signals, comprising:
   a source of seed pulses;

a primary resonator terminated by first and second mirrors and arranged to receive the seed pulses, the primary resonator including a gain-medium and an optical switch for closing the primary resonator to trap therein a seed pulse from the source thereof and for opening the primary resonator to deliver the seed pulse therefrom after the seed pulse has been amplified in the primary resonator;

a pump radiation source arranged to optically pump the gain-medium in a continuous-pumping mode;

a secondary resonator including the gain-medium, the secondary resonator not including the optical switch but including a selectively-variable attenuator operable for selectively varying losses in the secondary resonator;

control electronics responsive to trigger-signal for operating the optical switch and the selectively-variable attenuator, the control electronics being arranged such that before a trigger-signal has been received, the primary resonator is open such that no lasing occurs therein, loss of the selectively-variable attenuator is set to at a first loss-level low enough to allow lasing in the secondary resonator sufficient to limit available gain in the gain-medium at a level below saturation;

wherein the control electronics are also arranged such that, when a trigger signal is received, the selectively-variable attenuator is set at a second loss-level high enough to prevent lasing in the secondary resonator, whereby gain in the gain-medium rises until after a first predetermined time period the optical switch first closes the primary resonator to trap a first seed pulse from the source thereof therein and after a second predetermined time period, during which the trapped first seed pulse is amplified and the gain in the gain-medium falls below the limit level, the optical switch opens the primary resonator to deliver the amplified first seed pulse, and the selectively-variable attenuator is reset the first loss-level whereby lasing again occurs in the secondary resonator and the gain in the gain-medium returns to the limited level; and wherein the foregoing sequence of operations of the selectively-variable attenuator and the optical switch are repeated for subsequently received trigger-pulses such that subsequently delivered amplified pulses each have about the same energy as the first amplified seed pulse.

12. The apparatus of claim 11, wherein the optical switch includes a Pockels cell, and the selectively-variable attenuator is an acousto-optic modulator.

13. A method of operating an amplifier having a continuously pumped gain medium located within both a primary and a second resonator, said primary and secondary resonators partially overlapping, said primary resonator receiving a train of seed pulses, said method comprising the steps of:

(a) operating the amplifier in a condition wherein the primary resonator is open such that the seed pulses are not trapped and controlling the losses in the secondary resonator such that lasing occurs therein at a level selected to control the gain available in the gain medium;

(b) in response to a trigger signal, increasing the losses in the secondary resonator to inhibit lasing so that the gain in the gain medium will increase;

(c) thereafter, closing the primary resonator to trap a seed pulse therein which circulates and is amplified;

(d) thereafter opening the primary resonator to outcouple the amplified seed pulse;

(e) thereafter decreasing the losses in the secondary resonator to return to the operating condition defined in step (a); and (f) repeating steps (b) to (e) to generate a series of amplified output pulses.

14. A method as recited in claim 13, wherein the losses in the secondary resonator are controlled using a selectively variable attenuator.

15. A method as recited in claim 14, wherein the attenuator is an acousto-optic modulator.

16. A method as recited in claim 13, wherein the opening and closing of the primary resonator is performed by selectively controlling the polarization orientation of the seed pulses within the primary resonator.

17. A method as recited in claim 13, wherein the time between steps (b) and (c) is less than the time necessary for the gain medium to reach saturation.

\* \* \* \* \*